(12) United States Patent
Yu et al.

(10) Patent No.: US 11,313,695 B2
(45) Date of Patent: *Apr. 26, 2022

(54) AUGMENTED REALITY NAVIGATIONAL INDICATOR

(71) Applicant: Phiar Technologies, Inc., Redwood City, CA (US)

(72) Inventors: Chen-Ping Yu, Santa Clara, CA (US); Xinyu Li, Jersey City, NY (US); Aaditya Chandrasekhar, San Francisco, CA (US)

(73) Assignee: Phiar Technologies, Inc., Redwood City, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/569,650

(22) Filed: Sep. 12, 2019

(65) Prior Publication Data

US 2020/0103247 A1    Apr. 2, 2020

Related U.S. Application Data

(63) Continuation of application No. 16/255,825, filed on Jan. 24, 2019, now Pat. No. 10,495,476.
(Continued)

(51) Int. Cl.
*G01C 21/36* (2006.01)
*G06T 7/11* (2017.01)
(Continued)

(52) U.S. Cl.
CPC ..... *G01C 21/3647* (2013.01); *G01C 21/3415* (2013.01); *G01C 21/365* (2013.01);
(Continued)

(58) Field of Classification Search
CPC ............ G01C 21/3647; G01C 21/3415; G01C 21/365; G01C 21/3691; G06T 7/11; G06T 11/60; G06T 2207/30252
(Continued)

(56) References Cited

U.S. PATENT DOCUMENTS 8,195,386 B2   6/2012  Hu et al.
8,493,198 B1   7/2013  Vasquez et al.
(Continued)

FOREIGN PATENT DOCUMENTS

CA      2743941 A1   12/2011
CN    103105174 A    5/2013
(Continued)

OTHER PUBLICATIONS

Low et al., "Augmented Reality based Indoor Positioning Navigation Tool," 2011, Publisher: IEEE.*
(Continued)

*Primary Examiner* — Tuan C To
(74) *Attorney, Agent, or Firm* — Cognition IP, P.C.; Edward Steakley

(57) ABSTRACT

A system and method may generate a more realistic augmented reality (AR) overlay by generating a segmentation image and blending it with one or more other images. The system may generate a segmentation image based on an input image. The segmentation image may be blended with an AR path overlay image to generate an object-masked AR path overlay image. The object-masked AR path overlay image may be blended with the input image to generate an output image.

20 Claims, 10 Drawing Sheets
(4 of 10 Drawing Sheet(s) Filed in Color)

Related U.S. Application Data

(60) Provisional application No. 62/737,563, filed on Sep. 27, 2018.

(51) Int. Cl.
*G06T 11/60* (2006.01)
*G01C 21/34* (2006.01)

(52) U.S. Cl.
CPC ............ *G01C 21/3691* (2013.01); *G06T 7/11* (2017.01); *G06T 11/60* (2013.01); *G06T 2207/30252* (2013.01)

(58) Field of Classification Search
USPC .......................................................... 701/431
See application file for complete search history.

(56) References Cited

U.S. PATENT DOCUMENTS

| | | | |
|---|---|---|---|
| 9,613,455 B1* | 4/2017 | Nelson | G09B 29/10 |
| 9,916,508 B2 | 3/2018 | Pillai et al. | |
| 10,055,650 B2 | 8/2018 | Ho et al. | |
| 10,169,680 B1* | 1/2019 | Sachdeva | G06T 15/30 |
| 10,203,762 B2 | 2/2019 | Bradski et al. | |
| 10,210,403 B2 | 2/2019 | Mittal et al. | |
| 10,281,293 B2* | 5/2019 | Musabji | G06Q 30/0261 |
| 10,402,995 B2 | 9/2019 | Kwant et al. | |
| 10,495,476 B1* | 12/2019 | Yu | G01C 21/3415 |
| 10,621,725 B2* | 4/2020 | Fan | G06K 9/00818 |
| 10,663,315 B2* | 5/2020 | Iguchi | G08G 1/096805 |
| 10,670,418 B2* | 6/2020 | Breedvelt-Schouten | G06K 9/00791 |
| 10,982,968 B2* | 4/2021 | Elangovan | G01C 21/3667 |
| 2010/0104199 A1 | 4/2010 | Zhang et al. | |
| 2011/0216935 A1 | 9/2011 | Mays et al. | |
| 2012/0224060 A1 | 9/2012 | Gurevich et al. | |
| 2012/0226437 A1* | 9/2012 | Li | G01C 21/3647 701/423 |
| 2013/0194110 A1* | 8/2013 | Kim | G06K 9/00671 340/905 |
| 2013/0322692 A1 | 12/2013 | Guan | |
| 2014/0063064 A1 | 3/2014 | Seo et al. | |
| 2014/0195147 A1* | 7/2014 | Gluck | G01C 21/3667 701/428 |
| 2014/0354684 A1 | 12/2014 | Beckwith | |
| 2014/0362195 A1 | 12/2014 | Ng-Thow-Hing et al. | |
| 2015/0030255 A1 | 1/2015 | Wu et al. | |
| 2015/0046812 A1 | 2/2015 | Darby et al. | |
| 2015/0062168 A1* | 3/2015 | Ng-Thow-Hing | G06F 3/017 345/633 |
| 2015/0175068 A1* | 6/2015 | Szostak | B60K 35/00 340/435 |
| 2015/0204687 A1 | 7/2015 | Yoon et al. | |
| 2015/0363934 A1* | 12/2015 | Ko | G06T 7/73 701/431 |
| 2016/0267331 A1 | 9/2016 | Pillai et al. | |
| 2017/0003134 A1 | 1/2017 | Kim et al. | |
| 2017/0103286 A1* | 4/2017 | Osipov | H04N 5/765 |
| 2017/0220874 A1 | 8/2017 | Ayvaci et al. | |
| 2017/0314954 A1 | 11/2017 | Golding et al. | |
| 2018/0056996 A1 | 3/2018 | Lee | |
| 2018/0209802 A1 | 7/2018 | Jung et al. | |
| 2018/0336695 A1 | 11/2018 | Fujimura et al. | |
| 2019/0011924 A1 | 1/2019 | Xiao | |
| 2019/0034740 A1 | 1/2019 | Kwant et al. | |
| 2019/0035101 A1 | 1/2019 | Kwant et al. | |
| 2019/0049724 A1 | 2/2019 | Kimura et al. | |
| 2019/0080206 A1 | 3/2019 | Hotson et al. | |
| 2019/0156128 A1 | 5/2019 | Zhang et al. | |
| 2020/0074674 A1 | 3/2020 | Guo et al. | |

FOREIGN PATENT DOCUMENTS

| | | | | |
|---|---|---|---|---|
| CN | 104346620 | A | | 2/2015 |
| CN | 106969779 | A * | 7/2017 | ......... G01C 21/3492 |
| CN | 104268519 | B * | 3/2018 | |
| CN | 108154158 | A * | 6/2018 | |
| CN | 108268138 | A * | 7/2018 | |
| EP | 2541201 | A2 * | 1/2013 | ............. G01C 21/20 |
| EP | 3343506 | A1 * | 7/2018 | ............. G06T 17/10 |
| JP | 2006209510 | A | | 8/2006 |
| JP | 2018007037 | A | | 1/2018 |
| KR | 20120007781 | U | | 11/2012 |
| KR | 20150074750 | A | | 7/2015 |
| KR | 20170101758 | A | | 9/2017 |
| NZ | 562195 | A * | 5/2009 | ......... G01C 21/3626 |

OTHER PUBLICATIONS

Nicolas et al., "Pedestrian Track Estimation with Handheld Monocular Camera and Inertial-Magnetic Sensor for Urban Augmented Reality,".*

"Augmented Reality & Driving: enhancing the driving experience," retrieved Jan. 24, 2019 <https://www.youtube.com/watch?v=0OdZXf1E7Z8>.

"Telenav's Augmented Reality," retrieved Jan. 24, 2019 <https://www.youtube.com/watch?v=2Kt0ad03iHU>.

"MBUX Augmented Reality for Navigation in Mercedes-Benz A-Class 2018::[1001 cars]," retrieved Jan. 24, 2019 <https://www.youtube.com/watch?v=44myNm8T1Vw>.

"Windshield HUD User Interface—Augmented Reality Navigation," retrieved Jan. 24, 2019 <https://www.youtube.com/watch?v=g-_2KmHRqQM>.

"Hyundai Augmented Reality Demonstration—CES 2015," retrieved Jan. 24, 2019 <https://www.youtube.com/watch?v=iZg89ov75QQ>.

"Wikitude Navigation," retrieved Jan. 24, 2019 <https://www.wikitude.com/showcase/wikitude-navigation/>.

Rusch, Michelle L. et al., "Directing driver attention with augmented reality cues", US National Library of Medicine National Institutes of Health, Jan. 16, 2013 (https://www.ncbi.nlm.nih.gov/pmc/articles/PMC3891797/).

S. Azami et al., "Route Guidance Sign Identification Using 2-D Structural Description," 1996, Publisher: IEEE.

Takuji et al., "Pedestrian Route Guidance System Using Moving Information Based on Personal Feature Extraction," 2008, Publisher: IEEE.

* cited by examiner

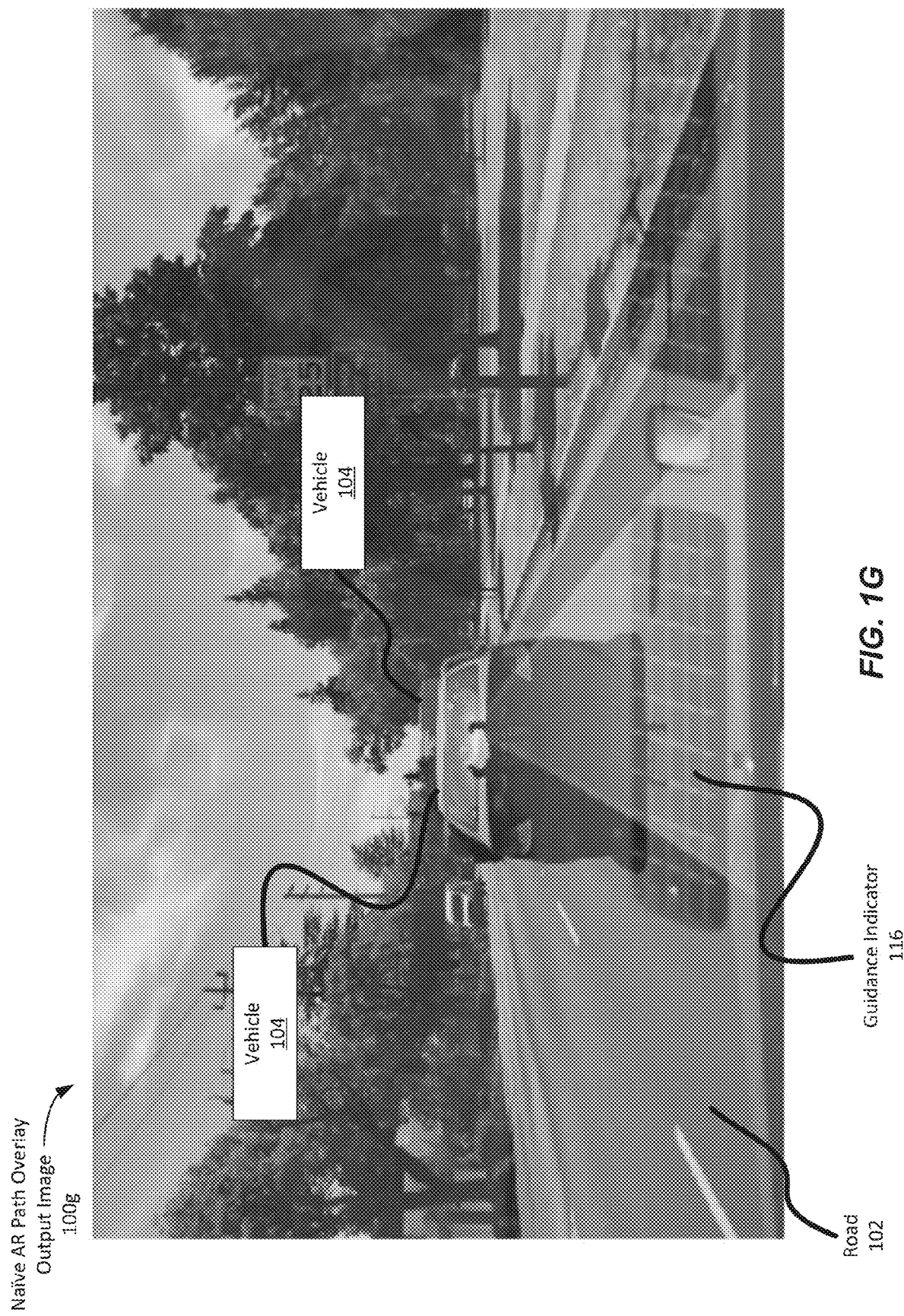

AUGMENTED REALITY NAVIGATIONAL INDICATOR

CROSS-REFERENCE TO RELATED APPLICATIONS

This application is a continuation of U.S. application Ser. No. 16/255,825, filed Jan. 24, 2019, which claims the benefit of U.S. Provisional Patent Application No. 62/737,563, filed Sep. 27, 2018, which are all hereby incorporated by reference in their entirety.

TECHNICAL FIELD

The present disclosure generally relates to real-time navigation systems and, more particularly, to augmented reality navigation systems and methods.

BACKGROUND

Computer implemented real-time navigation systems are commonly provided in vehicles and on mobile devices. These navigation systems use global-positioning-system (GPS) coordinates of the system or the device in which the system is implemented to display, in real time, the current location of the system on a map. These navigation systems can provide real-time, or turn-by-turn directions from the current location to a destination location for vehicle, bicycle, walking, or public transportation. These navigation systems often display a computer-generated depiction of the roads and sidewalks, along with an indicator of the current location, and an indicator of the next direction along a route. The indicator of the next direction can be an arrow that extends from the current location in the direction in which the user should proceed, such as an indicator of a left turn, a right turn, a roadway exit, a roadway entrance, or an indicator to proceed along the current direction.

However, these navigation systems typically use stored maps that may not include new or mobile objects in the user's path.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are included to provide further understanding and are incorporated in and constitute a part of this specification, illustrate disclosed embodiments and together with the description serve to explain the principles of the disclosed embodiments. In the drawings:

FIG. 1G illustrates an alternate schematic illustration of the augmented reality navigation operations according to FIG. 1A.

DETAILED DESCRIPTION

Figure 1A:
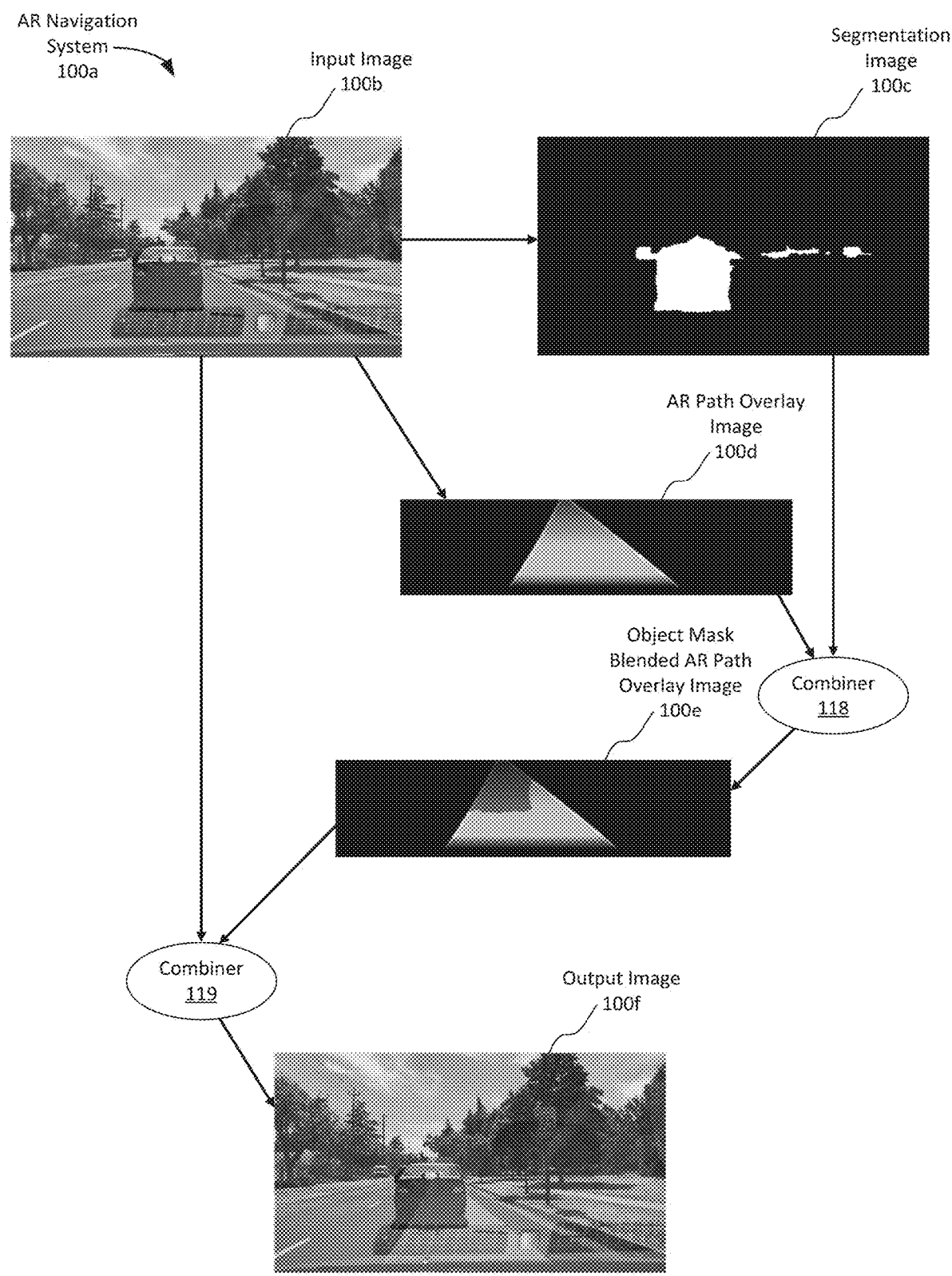
FIG. 1A is a schematic illustration of augmented reality navigation operations according to certain aspects of the present disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

As an improvement to existing computer implemented real-time navigation systems in which guidance indicators are displayed together with a location indicator and a map, augmented reality navigation systems and methods are provided.

Augmented reality navigation systems and methods provide enhanced guidance indicators in combination with a real-time view of a real-world guidance route. The real-time view of the real-world guidance route may include a direct view to the route by a user of the system or may be an image of the environment around the system that includes the route.

The enhanced guidance indicator is overlaid on the direct view or image of the real-time view to indicate to the user of the system, where to proceed in the real-world environment to follow the real-world guidance route. The enhanced guidance indicator provides an improvement over the guidance arrows of conventional navigation systems that are displayed over a map, at least in that the enhanced guidance indicator is generated and displayed responsive to real-time images of the upcoming route at the current time and at the current location of the system. This reduces or eliminates the need for the user to direct attention away from driving or otherwise proceeding along the guided route to determine how the displayed map correlates to the real-world scene in the user's view.

The route may include a roadway (e.g., a street, a highway, a freeway, a tollway, a parking lot, or the like) or other pathway (e.g., a sidewalk, a walking path, a bike path, a stairway, an escalator, or any other indoor or outdoor real-world environment) through or along which the navigation system is guiding the user. As examples, when the augmented reality (AR) navigation system is being used in a car or other road-based vehicle, the route may include a path along the roadway on which the vehicle is currently located, and the real-time view includes the portion of the roadway over which the guidance is directing the user. The enhanced guidance indicator is overlaid on this real-time view to display the AR navigation guidance to the user.

Because the roadways and other pathways along which users are guided are typically unchanging from day to day, week to week, or over periods of years or decades, generating guidance indicators for routes on these roadways or pathways benefits from prior knowledge of the location, size, width, and other aspects of the roadways or pathways. Accordingly, where a portion of a particular street curves to the right, an enhanced guidance indicator that is overlaid on an image of that portion of that particular street can correspondingly curve to indicate the AR guided route. Moreover, where a left turn onto a new street is to be instructed by the system, the enhanced guidance indicator that is overlaid on an image of the intersection between the current street and the new street can be bent to indicate the AR guided turn. These enhanced guidance indicators can be sized, shaped, and located to conform to the corresponding roadway features based on real-time images of the roadways and/or a priori knowledge of the roadway features.

However, at any given time, other objects such as other vehicles, bicyclists, pedestrians, or debris that are not known a priori to the system can be located in the route, often at locations over which the enhanced guidance indicators are to be overlaid on the scene (e.g., on an image or a direct view of the scene).

In accordance with various aspects of the subject disclosure, enhanced guidance indicators are displayed that adapt, in real time, to the changing objects in the route so that the objects are visible, and the guidance indicators appear to the user to be overlaid on the roadway or pathway, rather than over objects on the roadway or pathway. In this way, an improved AR navigation system is disclosed that displays a more realistic AR overlay, appearing to lie underneath pathway objects rather than blended with pathway objects, which may enhance the safety of displaying navigational guidance to a user, particularly when the user is operating a vehicle. As described in further detail hereinafter, in order to display AR guidance in which roadway or pathway objects appear on top of a guidance indicator overlay, the guidance overlay may have portions that overlap the objects dimmed, or removed, to create the effect of that object occluding the guidance overlay.

FIGS. 1A-F illustrate an example in which AR navigation guidance is displayed in a scenario in which an object on a roadway occludes a guidance indicator that indicates the recommended path for a user. In the example of FIG. 1A, an AR navigation system 100a receives, generates, and displays images for AR navigation guidance. AR navigation system 100a receives an input image such as input image 100b. The input image 100b may be captured by a camera. The camera may be a camera of a mobile device such as a smart phone in which the AR navigation system 100a is implemented or the camera may be a camera of a vehicle incorporating the AR navigation system 100a or communicatively coupled to the AR navigation system 100a (as examples).

Figure 1B:
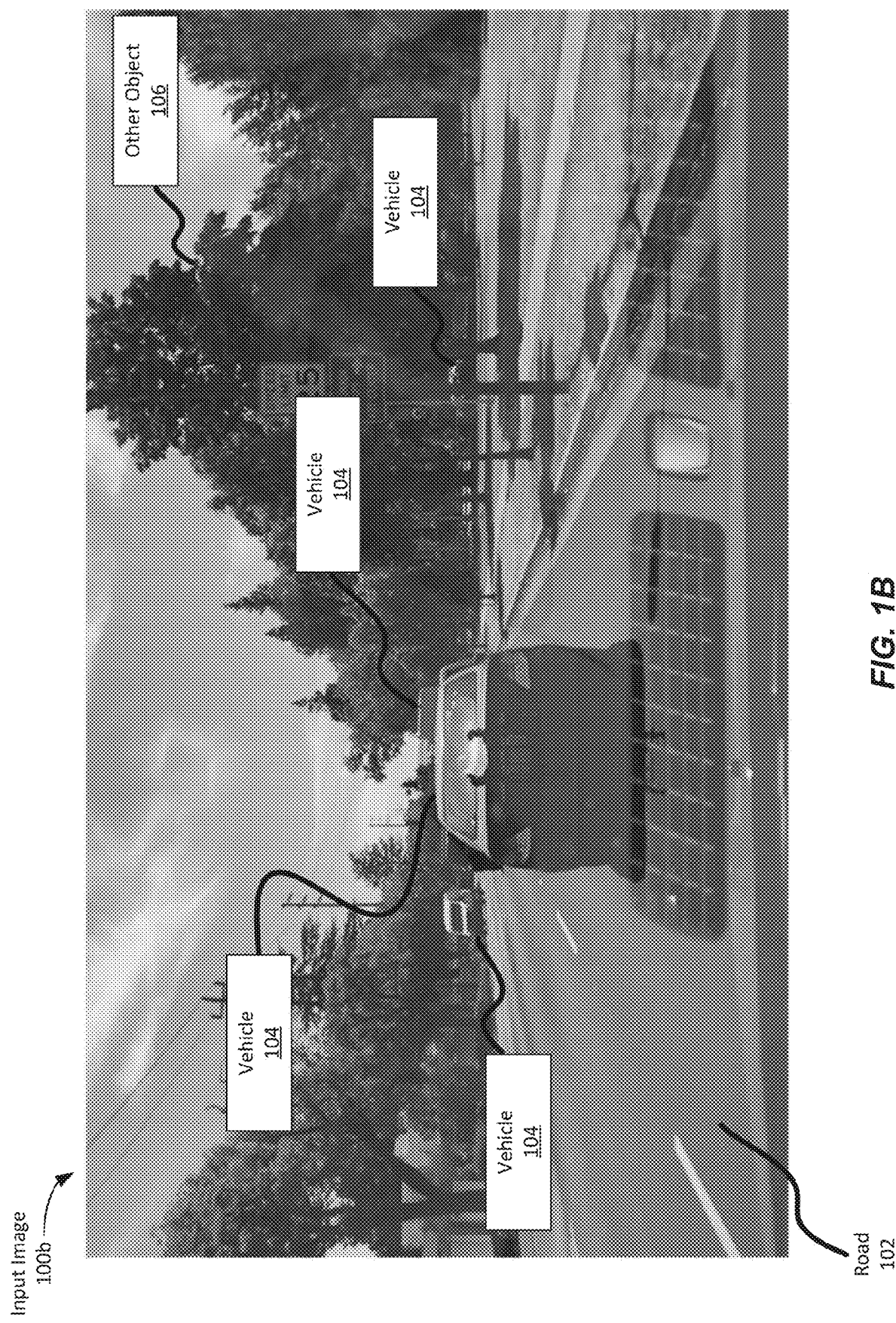
FIGS. 1B-1F further illustrate the schematic illustration of the augmented reality navigation operations according to FIG. 1A.

As shown in FIG. 1A and FIG. 1B, input image 100b approximates the current view of the real-world scene in the user's view (e.g., through the windshield of a vehicle while driving). In this example, input image 100b includes roadway 102, a vehicle 104 driving on the same roadway 102 as that of the user, at least one other vehicle captured in the input image 100b, and other objects 106 such as trees, sidewalks, etc. that are not on roadway 102.

Figure 1C:
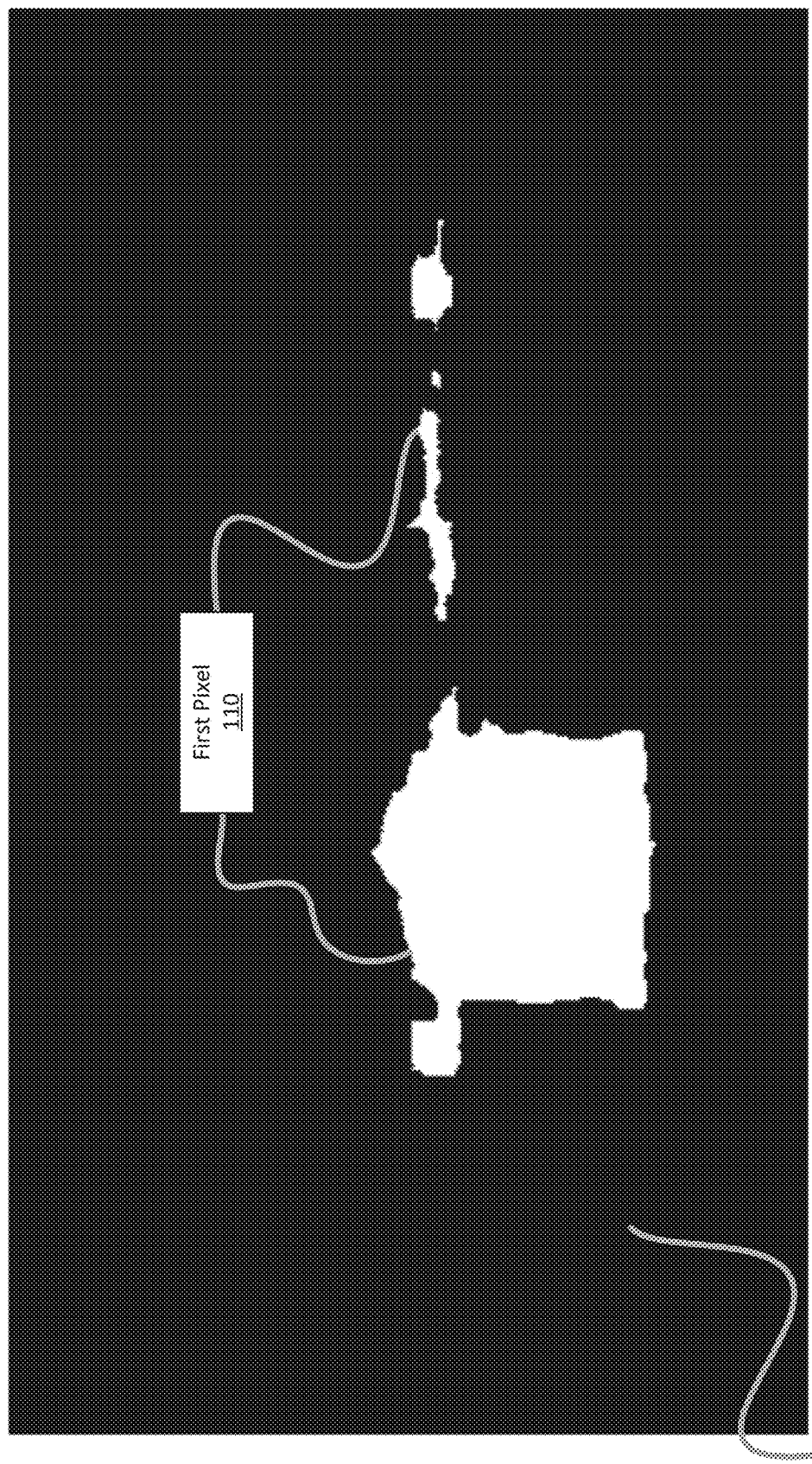

As indicated in FIG. 1A, the AR navigation system 100a may generate a segmentation image 100c based on input image 100b, further shown in FIG. 1C. As shown in FIGS. 1A and 1C, segmentation image 100c may be a binary object mask image having the same number of pixels and same dimensions as that of input image 100b. The binary object mask image includes having pixels 110 set to a first common value (e.g., one) where roadway objects such as vehicle 104 are located in input image 100b, and having pixels 112 set to another common value (e.g., zero) elsewhere. In this example, all of the pixels of the segmentation image 100c will either be pixel 110 with the first common value or pixel 112 with the another common value different from that of pixel 110. Segmentation image 100c may be generated by detecting (e.g., using artificial intelligence operations such as deep learning semantic segmentation operations) the roadway, roadway objects such as vehicle 104 on the roadway, and other objects such as objects 106 in input image 100b. The AR navigation system 100a can use the artificial intelligence operations to detect and delineate among the different object and set pixels in the segmentation image that correspond spatially to the roadway objects in input image 100b to the first common value. In one example, the pixels derived from input image 100b that are assigned the second common value can be that of any background pixels not on the road, road pixels, or pixels that indicate areas adjacent to the road. The remaining pixels not assigned with the second common value can be assigned with the first common value. In one example, other objects on the roadway other than vehicle 104 can be detected such as a pedestrian, a bicycle, a pedestrian, or any other moving object relative to the road and be assigned the first common value in the segmentation image 100c.

In one example, the segmentation image can be generated by using artificial intelligence operations semantic segmentation operations. In this example, the AR navigation system 100a can semantically identify and segment the image, such as input image 100b, into regions. The regions can be classified or based on portions or one or more pixels of the image that are identified as moving objects or roadway objects, or both.

In one example, the semantic segmentation is performed based on a detection of changes in pixels to indicate a moving object. In an embodiment, pixels that do not change may be determined to be background. Pixels that do change may be determined to be moving objects. In another example, the frame of reference of the vehicle in which the camera is located is moving so pixels of background objects may move. However, motion of the vehicle may be modeled, such as by a motion equation of the vehicle accounting for its velocity and acceleration, and pixels changing according to the motion equation of the vehicle may be determined to be background and pixels that do not change according to the motion equation of the vehicle may be determined to be other moving objects.

In one example, an object detection algorithm may be used to assist with semantic segmentation. Object detection may be performed in some examples by a neural network, such as a convolutional neural network or a multi-layer neural network in which at least one layer is a convolutional neural network. The object detection algorithm may accept as input an image or portion of an image and output a probability distribution that models the probability that the image or image portion contains an object of a specific type, such as a car, bicycle, or pedestrian. The highest probability outcome may be selected as the output object classification. The object detection algorithm may be based on machine learning and trained on training examples of known objects and associated training labels that identify the known objects. The object detection algorithm may identify moving objects in the scene with bounding regions and may also output feature tensors representing features used to identify the objects. Segmentation may use the bounding regions and feature tensors to classify individual pixels based on whether they belong to a particular object or the background. In one example, the object detection and segmentation steps may be performed by a single machine learning model, such as a neural network or a multi-layer neural network with one or more convolutional layers.

In one example, a deep, multi-layer neural network with one or more convolutional neural network layers is used to perform semantic segmentation. The deep neural network may accept as input an image or portion of an image and output a probability distribution for the classification of each pixel, for example, to a particular type of object, such as a car, bicycle, or pedestrian, or to background. The highest probability outcome may be selected as the pixel's classification. The deep neural network may be trained on training examples of images with pixel-level classifications identifying objects and background.

In another example, the object mask image can be generated based methods other than the use of artificial intelligence.

Figure 1D:
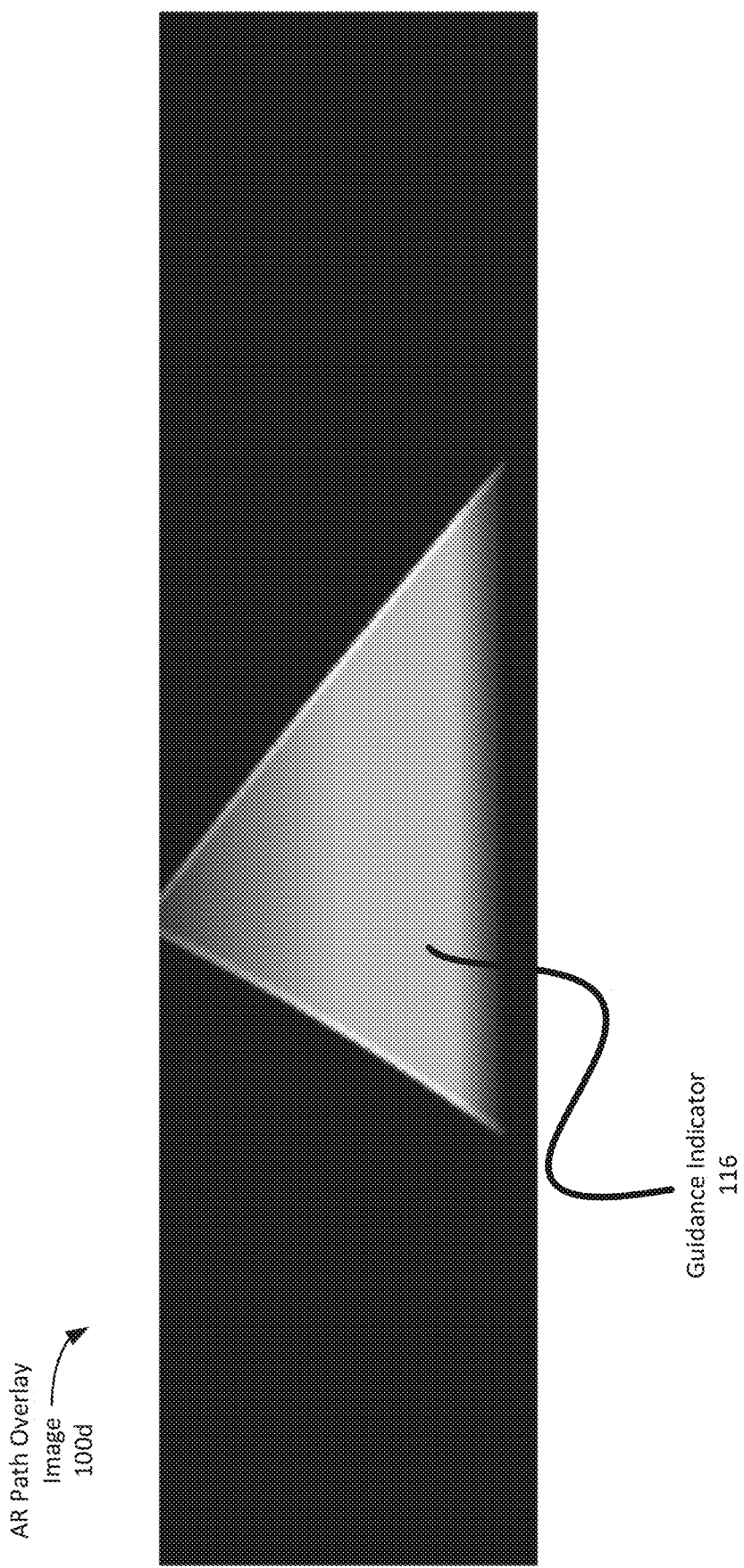

As indicated in FIGS. 1A and 1D, in addition to (e.g., in parallel with) the generation of segmentation image 100c, an AR path overlay image 100d is also generated by the AR navigation system 100a. As shown, AR path overlay image 100d includes a guidance indicator 116, to indicate the direction in which the user should guide the vehicle to proceed along the guidance route. In one example, the guidance indicator 116 can correspond to a specific road lane that the user or the AR navigation system 100a is currently on. In one example, the guidance indicator can correspond to multiple lanes or portions of the road. The guidance indicator 116 can be generated by using GPS data for the route that the user has set or has been set for the user by the AR navigation system 100a.

In one example, AR navigation system 100a first generates the segmentation image 100c and then subsequently generates the AR path overlay image 100d. In another example, the AR navigation system 100a first generates the AR path overlay image 100d and then subsequently generates the segmentation image 100c. In another example, the AR navigation system 100a concurrently generates the segmentation image 100c and the AR path overlay image 100d.

Figure 1E:
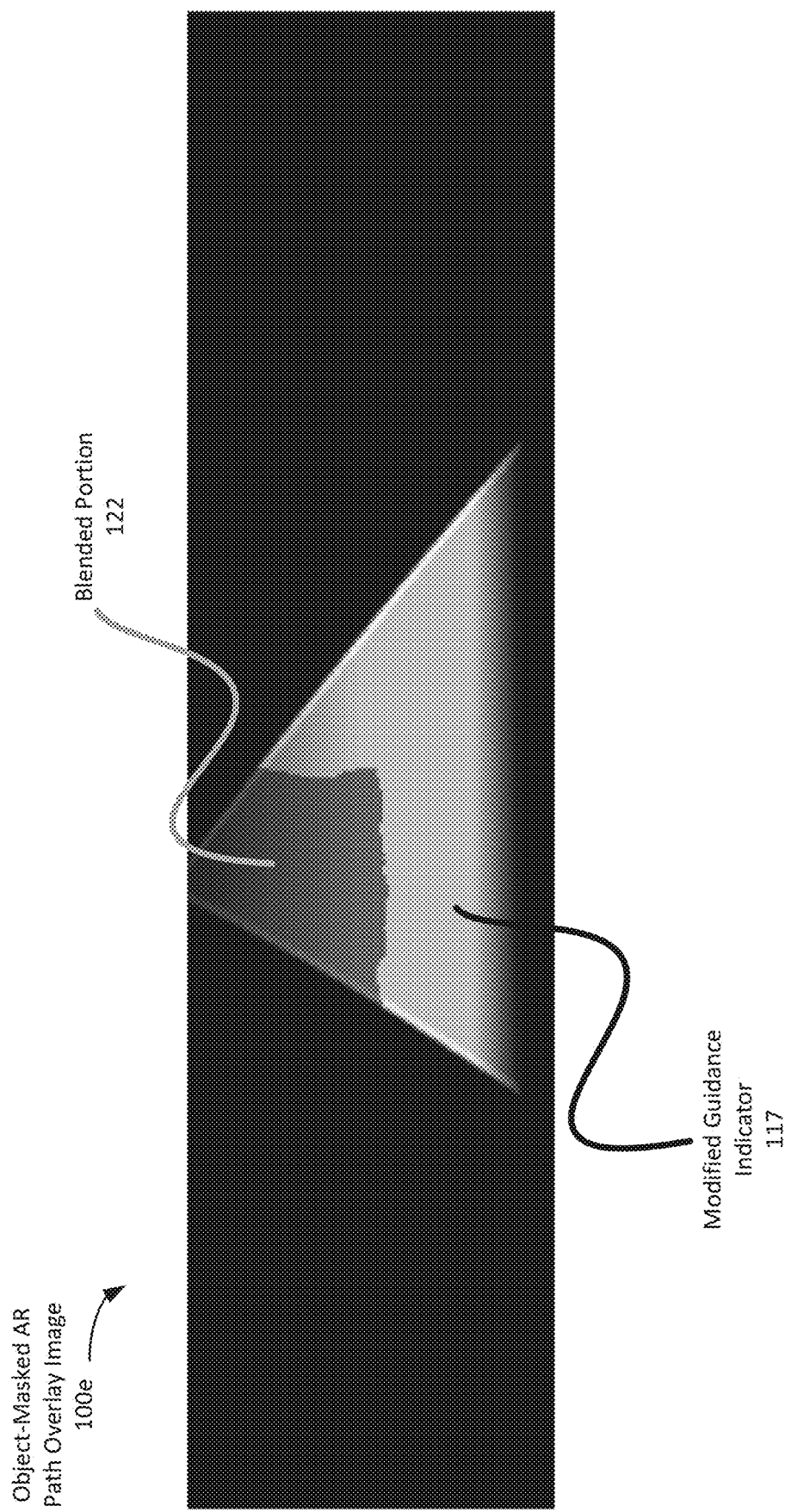

As indicated in FIGS. 1A and 1E, segmentation image 100c and AR path overlay image 100d may be blended by a combiner 118. Combiner 118 may blend segmentation image 100c and AR path overlay image 100d. Once combined, the AR navigation system 100a can identify the pixels in the segmentation image 100c having the first value (e.g., one) that overlap with the pixels that form guidance indicator 116 of the AR path overlay image 100d. The AR navigation system 100a can then modify the corresponding pixels of the guidance indicator 116 in AR path overlay image 100d (e.g., by multiplying the corresponding pixels with a scalar that is than one to dim that portion of AR path overlay image 100d or by setting the corresponding pixels to zero to effectively remove the pixels). The result will cause a dimming effect of at least a portion of the guidance indicator 116 of AR path overlay image 100d. For example, a scalar of 0.8 applied to the portion of pixels of guidance indicator 116 that overlaps with any first pixel 110 of segmentation image 100c will result in that portion of pixels of guidance indicator of 116 have a 20% reduction in brightness. In one example, the modification of the pixels of the guidance indicator by the scalar can be that of opacity.

As indicated in FIGS. 1A and 1E, combiner 118 generates an object-masked AR path overlay image 100e that includes a modified guidance indicator 117 having a blended portion 122 modified by combiner 118 based on segmentation image 100c. In this example, the blended portion 122 will include the portion of guidance indicator 116 that overlaps with any first pixel 110 of segmentation image 100c and result in a brightness or opacity different from that of the brightness or opacity of the rest of the guidance indicator 116. The combined blended portion 122 and the remaining unmodified portion of guidance indicator 116 will form the modified guidance indicator 117.

Figure 1F:
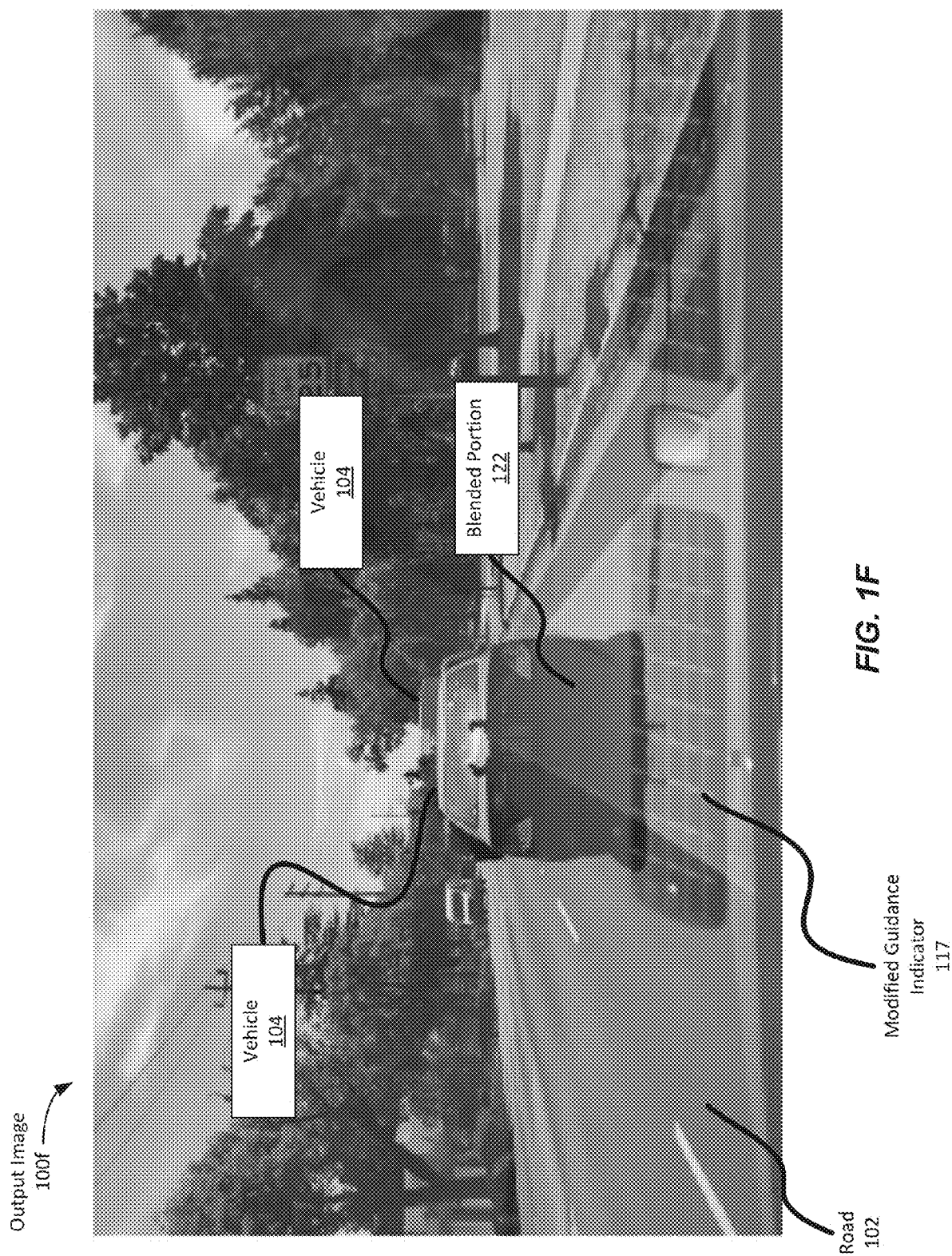

As indicated in FIGS. 1A and 1F, the AR navigation system 100a may then combine (e.g., add) object-masked AR path overlay image 100e with input image 100b, by a combiner 119, to display an output image 100f. As shown in FIGS. 1A and 1F, output image 100f includes input image 100b and modified guidance indicator 117. Due to the difference in brightness or opacity, or both of blended portion 122 or modified guidance indicator 117, the AR path overlay in output image 100f appears to fall underneath car 104.

For comparison, as illustrated in FIG. 1G, image 100g is also shown, in which input image 100b is combined with the unmodified AR path overlay image 100d. As shown, in image 100g, guidance indicator 116 appears to fall on top of the vehicle 104, which may be confusing or otherwise undesirable to the user, particularly if multiple roadway objects such as other vehicles, pedestrians, bicyclists, etc. are present and occludes the AR path overlay image displayed to the user.

It should also be appreciated that, output image 100f may be displayed on the user's mobile phone or on a display of a dedicated navigation device, or object-masked AR path overlay image 100e may be projected onto a direct view of the scene by the user (e.g., using a head-up display or by projecting modified guidance indicator 117 onto the windshield of the vehicle in which the user is located). Although the example of FIG. 1A shows an example of AR navigation on a roadway from within a vehicle, this is merely illustrative, and the AR navigation systems and methods described herein (e.g., using object masks generated from segmentation methods to blend with an AR path overlay to create an occlusion effect) can be applied to other AR navigation scenarios, such as walking, driving, indoor, outdoor, etc.

Figure 2A:
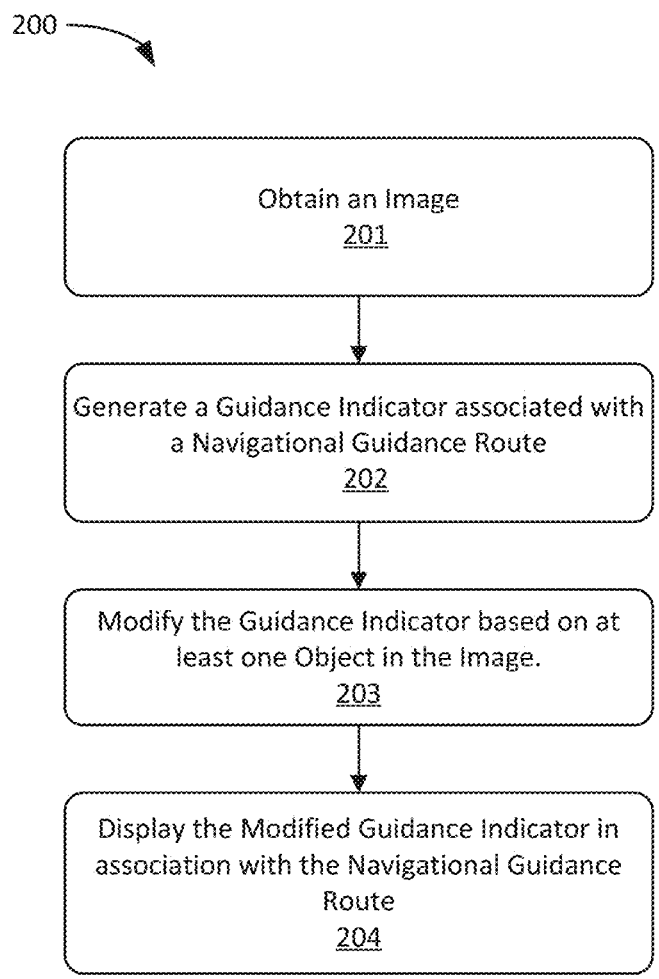
FIGS. 2A-B illustrate a flow chart of example processes for augmented reality navigation in accordance with various aspects of the subject technology.
Figure 2B:
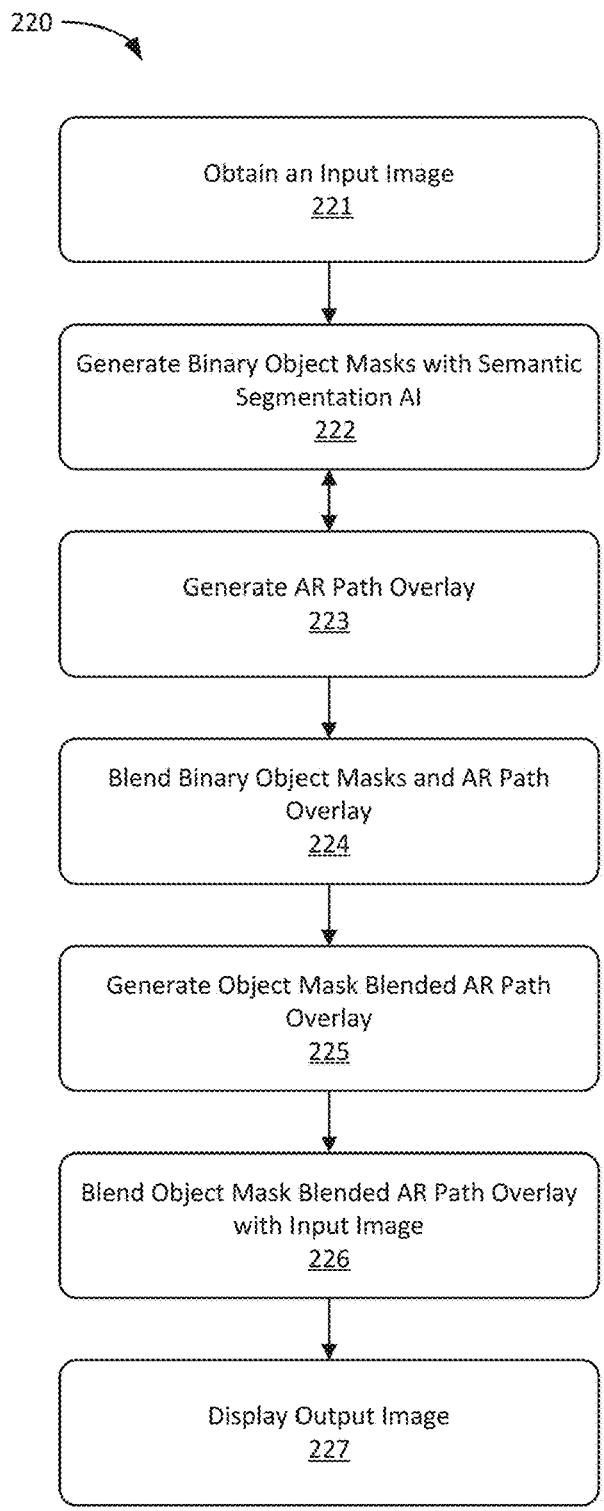

FIGS. 2A-B depicts a flow diagram of an example process for augmented reality (AR) navigation, in accordance with various aspects of the subject technology. For explanatory purposes, the example processes of FIGS. 2A-B is described herein with reference to the components of FIG. 1A. Further for explanatory purposes, some blocks of the example processes of FIGS. 2A-B are described herein as occurring in series, or linearly. However, multiple blocks of the example processes of FIGS. 2A-B may occur in parallel. In addition, the blocks of the example processes of FIGS. 2A-B need not be performed in the order shown and/or one or more of the blocks of the example processes of FIGS. 2A-B need not be performed.

In the depicted example flow diagram 200 of FIG. 2A, at block 201, an image such as input image 100b of FIG. 1A is obtained. The image may be obtained by a camera of a mobile device such as a smart phone, by a camera of a dedicated navigation device, a camera of a vehicle, or another camera.

At block 202, a guidance indicator (e.g., guidance indicator 116) associated with a navigational guidance route is generated. Generating the guidance indicator associated with the navigational guidance route may include generating an augmented-reality path overlay image such as AR path overlay image 100*d*, including the guidance indicator 116. The navigational guidance route and/or the guidance indicator may be determined or otherwise obtained based on a global positioning system location and map information.

At block 203, the guidance indicator is modified based on at least one object (e.g., a roadway object or pathway object such as car 104 on a roadway such as roadway 102) in the image. In order to modify the guidance indicator, a segmentation image such as segmentation image 100*c* of FIG. 1A may be generated based on the image, the segmentation image having first pixels (e.g., pixels 110) corresponding to the at least one object and having a first common value (e.g., one), and second pixels (e.g., pixels 112) having a second common value (e.g., zero). Modifying the guidance indicator based on the at least one object in the image may include modifying pixels in the augmented-reality path overlay image 100*d* that spatially correspond to the first pixels 110 having the first common value in the segmentation image 100*c*.

At block 204, the modified guidance indicator (e.g., modified guidance indicator 117) is provided for display in association with the navigational guidance route.

In one example, displaying the modified guidance indicator 117 for display in association with the navigational guidance route includes generating an output image such as output image 100*f* by combining the image with the augmented-reality path overlay image (e.g., image 100*e*) having the modified guidance indicator. In this example, the output image may then be displayed with a mobile electronic device or other device.

In another example, displaying the modified guidance indicator for display in association with the navigational guidance route may include projecting the augmented-reality path overlay image having the modified guidance indicator onto a windshield of a vehicle.

In the depicted example flow diagram 220 of FIG. 2B, at block 221, an input image such as input image 100*b* of FIG. 1A is obtained. The image may be obtained by a camera of a mobile device such as a smart phone, by a camera of a dedicated navigation device, a camera of a vehicle, or another camera.

At block 222, a binary object mask image is generated. The binary object masks can be generated based on generating a segmentation image such as segmentation image 100*c* of FIG. 1A, the segmentation image having first pixels (e.g., pixels 110) corresponding to the at least one object and having a first common value (e.g., one), and second pixels (e.g., pixels 112) having a second common value (e.g., zero).

At block 223, an AR path overlay including a guidance indicator (e.g., guidance indicator 116) associated with a navigational guidance route is generated. Generating the guidance indicator associated with the navigational guidance route may include generating an augmented-reality path overlay image such as AR path overlay image 100*d*, including the guidance indicator 116. The navigational guidance route and/or the guidance indicator may be determined or otherwise obtained based on a global positioning system location and map information.

At block 224, the binary object masks and AR path overlay can be blended such that the guidance indicator is modified based on at least one object (e.g., a roadway object or pathway object such as vehicle 104 on a roadway such as roadway 102) in the input image 100*b*.

At block 225, the blended binary object masks image and the AR path overlay image will form an object mask blended AR path overlay image including a modified guidance indicator. In this example, modifying the guidance indicator is based on the at least a portion of pixels in the AR path overlay image that spatially correspond to the first pixels 110 having the first common value in the segmentation image 100*c*.

At block 226, the object mask blended AR path overlay image is blended with the input image, displaying the modified guidance indicator on the input image.

At block 227, the blended object mask blended AR path overlay image with the input image forms an output image and is displayed to the user. In this example, the output image may be displayed with a mobile electronic device or other device.

Figure 3:
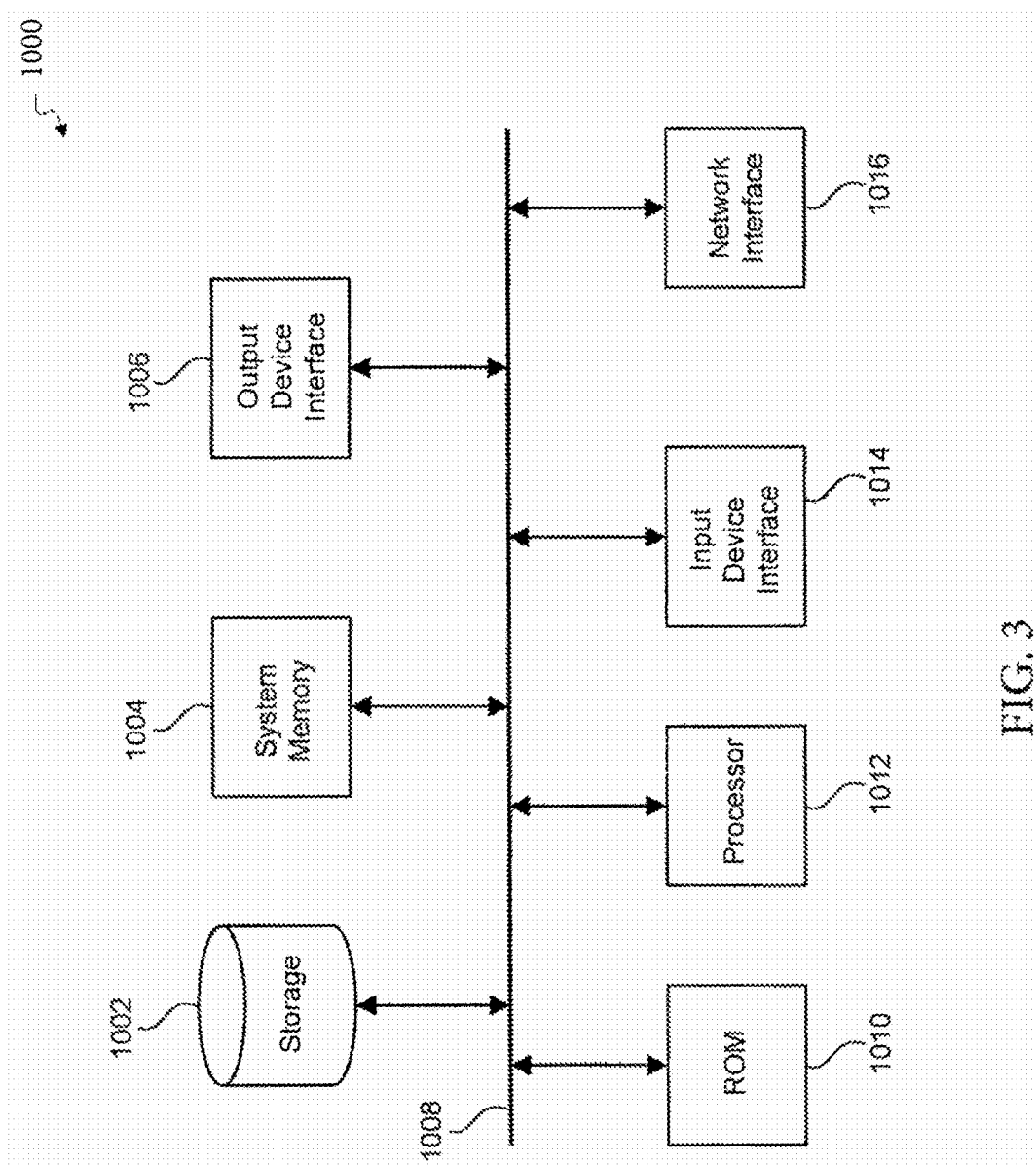
FIG. 3 illustrates an electronic system with which one or more implementations of the subject technology may be implemented.

FIG. 3 conceptually illustrates electronic system 1000 with which one or more aspects of the subject technology may be implemented. Electronic system 1000, for example, may be, or may be a part of, an augmented reality (AR) navigation system implemented in standalone device, a portable electronic device such as a laptop computer, a tablet computer, a phone, a wearable device, or a personal digital assistant (PDA), a vehicle, or generally any electronic device that transmits signals over a network. Such an electronic system includes various types of computer readable media and interfaces for various other types of computer readable media. Electronic system 1000 includes bus 1008, processing unit(s) 1012, system memory 1004, read-only memory (ROM) 1010, permanent storage device 1002, input device interface 1014, output device interface 1006, and network interface 1016, or subsets and variations thereof.

Bus 1008 collectively represents all system, peripheral, and chipset buses that communicatively connect the numerous internal devices of electronic system 1000. In one or more embodiments, bus 1008 communicatively connects processing unit(s) 1012 with ROM 1010, system memory 1004, and permanent storage device 1002. From these various memory units, processing unit(s) 1012 retrieves instructions to execute and data to process in order to execute the processes of the subject disclosure. The processing unit(s) can be a single processor or a multi-core processor in different embodiments.

ROM 1010 stores static data and instructions that are needed by processing unit(s) 1012 and other modules of the electronic system. Permanent storage device 1002, on the other hand, is a read-and-write memory device. This device is a non-volatile memory unit that stores instructions and data even when electronic system 1000 is off. One or more embodiments of the subject disclosure use a mass-storage device (such as a magnetic or optical disk and its corresponding disk drive) as permanent storage device 1002.

Other embodiments use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such as random access memory. System memory 1004 stores any of the instructions and data that processing unit(s) 1012 needs at runtime. In one or more embodiments, the processes of the subject disclosure are stored in system memory 1004, permanent storage device 1002, and/or ROM 1010. From these various memory units, processing unit(s) 1012 retrieves instructions to execute and data to process in order to execute the processes of one or more embodiments.

Bus 1008 also connects to input and output device interfaces 1014 and 1006. Input device interface 1014 enables a user to communicate information and select commands to the electronic system. Input devices used with input device interface 1014 include, for example, alphanumeric keyboards, pointing devices (also called "cursor control devices"), cameras or other imaging sensors, or generally any device that can receive input. Output device interface 1006 enables, for example, the display of images generated by electronic system 1000. Output devices used with output device interface 1006 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more embodiments may include devices that function as both input and output devices, such as a touch screen. In these embodiments, feedback provided to the user can be any form of sensory feedback, such as visual feedback, auditory feedback, or tactile feedback; and input from the user can be received in any form, including acoustic, speech, or tactile input.

Finally, as shown in FIG. 3, bus 1008 also couples electronic system 1000 to a network (not shown) through network interface 1016. In this manner, the computer can be a part of a network of computers (such as a local area network ("LAN"), a wide area network ("WAN"), or an Intranet, or a network of networks, such as the Internet. Any or all components of electronic system 1000 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more embodiments, the computer readable media is non-transitory computer readable media, computer readable storage media, or non-transitory computer readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that some or all steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the appended claims. Moreover, nothing disclosed herein is intended to be dedicated to the public regardless of whether such disclosure is explicitly recited in the claims. No claims element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Brief Description of the Drawings, and Claims of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims s reflect, inventive subject matter lies in less than all features of a single disclosed configuration or operation. The following claims are hereby incorporated into the Detailed Description, with each claims standing on its own to represent separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A method, comprising:
    generating a guidance indicator corresponding to a guidance route;
    obtaining an image of the guidance route including an object;
    generating a segmentation image based on the image, the segmentation image having first pixels corresponding to the object in the image;
    modifying a portion of the guidance indicator based on at least a position of the first pixels in the segmentation image; and
    displaying the modified guidance indicator on a display.

2. The method of claim 1, wherein generating the segmentation image is performed by applying semantic segmentation on the image.

3. The method of claim 2, wherein the image comprises an image of a roadway, and wherein the at least one object comprises at least one object on the roadway.

4. The method of claim 3, wherein generating the guidance indicator associated with the navigational guidance route comprises generating an augmented-reality path overlay image including the guidance indicator.

5. The method of claim 4, wherein modifying the guidance indicator based on the at least one object in the image comprises modifying pixels in the augmented-reality path overlay image that spatially correspond to the first pixels in the segmentation image.

6. The method of claim 5, wherein displaying the modified guidance indicator in association with the navigational guidance route comprises generating an output image by combining the image with the augmented-reality path overlay image having the modified guidance indicator.

7. The method of claim 6, further comprising displaying the output image on a display of a mobile electronic device.

8. The method of claim 5, wherein displaying the modified guidance indicator in association with the navigational guidance route comprises projecting the augmented-reality path overlay image having the modified guidance indicator onto a windshield of a vehicle.

9. The method of claim 1, further comprising determining the navigational guidance route based on a global positioning system location and map information.

10. A navigation system comprising one or more non-transitory computer-readable media storing computer-executable instructions that, when executed on one or more processors, cause the one or more processors to perform acts comprising:
generating a guidance indicator corresponding to a guidance route;
obtaining an image of the guidance route including an object;
generating a segmentation image based on the image, the segmentation image having first pixels corresponding to the object in the image;
modifying a portion of the guidance indicator based on at least a position of the first pixels in the segmentation image; and
displaying the modified guidance indicator on a display.

11. The navigation system of claim 10, wherein generating the segmentation image is performed by applying semantic segmentation on the image.

12. The navigation system of claim 11, wherein the image comprises an image of a roadway, and wherein the at least one object comprises at least one object on the roadway.

13. The navigation system of claim 12, wherein generating the guidance indicator associated with the navigational guidance route comprises generating an augmented-reality path overlay image including the guidance indicator.

14. The navigation system of claim 13, wherein modifying the guidance indicator based on the at least one object in the image comprises modifying pixels in the augmented-reality path overlay image that spatially correspond to the first pixels in the segmentation image.

15. The navigation system of claim 14, wherein displaying the modified guidance indicator in association with the navigational guidance route comprises generating an output image by combining the image with the augmented-reality path overlay image having the modified guidance indicator.

16. The navigation system of claim 15, further comprising instructions for displaying the output image on a display of a mobile electronic device.

17. The navigation system of claim 16, wherein displaying the modified guidance indicator in association with the navigational guidance route comprises projecting the augmented-reality path overlay image having the modified guidance indicator onto a windshield of a vehicle.

18. A non-transitory computer readable medium storing instructions that, when executed by a processor cause the processor to perform acts comprising:
generating a guidance indicator corresponding to a guidance route;
obtaining an image of the guidance route including an object;
generating a segmentation image based on the image, the segmentation image having first pixels corresponding to the object in the image;
modifying a portion of the guidance indicator based on at least a position of the first pixels in the segmentation image; and
displaying the modified guidance indicator on a display.

19. The non-transitory computer readable medium of claim 18, wherein generating the segmentation image is performed by applying semantic segmentation on the image.

20. The navigation system of claim 18, wherein the image comprises an image of a roadway, and wherein the at least one object comprises at least one object on the roadway.

* * * * *